United States Patent
Kume et al.

(10) Patent No.: US 7,220,475 B2
(45) Date of Patent: May 22, 2007

(54) POLISHING SHEET AND POLISHING WORK METHOD

(75) Inventors: Takahiro Kume, Touyo (JP); Hidenori Takeda, Imabara (JP)

(73) Assignee: Fuji Spinning Co., Ltd., Tokyo (JP)

( * ) Notice: Subject to any disclaimer, the term of this patent is extended or adjusted under 35 U.S.C. 154(b) by 249 days.

(21) Appl. No.: 10/642,280

(22) Filed: Aug. 18, 2003

(65) Prior Publication Data
US 2004/0247852 A1 Dec. 9, 2004

(30) Foreign Application Priority Data
Jun. 3, 2003 (JP) .............................. 2003-157526

(51) Int. Cl.
*B32B 3/00* (2006.01)
(52) U.S. Cl. ................... 428/143; 428/141; 428/312.2; 428/314.4; 428/317.9
(58) Field of Classification Search ................ 428/141, 428/143, 304.4, 312.2, 314.4, 317.9
See application file for complete search history.

(56) References Cited

U.S. PATENT DOCUMENTS 3,653,859 A * 4/1972 Zimmer et al. ............. 451/533
5,578,362 A 11/1996 Reinhardt et al. .......... 428/147
6,120,361 A * 9/2000 Konishi et al. ............. 451/287

FOREIGN PATENT DOCUMENTS

| JP | 05-008178 A | 1/1993 |
| JP | 10/249709 A | 9/1998 |
| JP | 2001-001270 A | 1/2001 |

* cited by examiner

*Primary Examiner*—Alicia Chevalier
(74) *Attorney, Agent, or Firm*—Roberts, Mlotkowski & Hobbes; Thomas W. Cole

(57) ABSTRACT

The present invention provides a polishing sheet that can secure a flatness of a material to be polished and can improve a polishing efficiency. A polishing pad 1 has a polyurethane sheet 2 made of polyurethane resin. The polyurethane sheet 2 has large cells 3 with a generally triangular sectional configuration rounded along a thickness direction thereof. Polyurethane resin exists in the polyurethane sheet 2 in a partition wall manner and fine foams 4 are formed in the polyurethane resin. Fine particles 5 added during manufacture of the polyurethane sheet 2 exist inside some of the fine foams 4 and the fine particles 5 are separable from the fine foams. By separating off fine particles positioned at a polishing face P by dummy polishing or the like, fine foams which evenly reserve a polishing liquid containing abrasive particles are formed at the polishing face P.

20 Claims, 5 Drawing Sheets

POLISHING SHEET AND POLISHING WORK METHOD

BACKGROUND OF THE INVENTION

1. Field of the Invention

The present invention relates to a polishing sheet and a polishing work method, and in particular relates to a polishing sheet having an elastic plastic foam sheet in which fine particles are contained and a polishing work method using the polishing sheet.

2. Description of Related Art

Conventionally, a polishing sheet is used to perform flattening work on a material required for flatness at a high accuracy, such as an optical material such as a lens, a plane parallel plate, a reflecting mirror or the like, a base plate for a hard disc, a silicon wafer, a liquid crystal glass or the like. For example, as a polishing sheet used for accurate flattening work, e.g. for the silicon wafer or the like, a polishing sheet of a nonwoven type obtained by drying a nonwoven sheet after the nonwoven sheet is impregnated with a resin liquid is known (refer to JP05-8178A publication). However, since the polishing sheet of this type has flexibility, there are drawbacks in that a polishing efficiency is low and a roll-off, i.e. peripheral edge portions of a material to be polished are polished more than a central portion thereof, occurs easily. In order to improve the polishing efficiency, there has been disclosed a polishing sheet having an independent foam structure obtained by hollow fine spherical bodies or the like in a plastic material with a high hardness (for example, refer to JP08-500622A publication). However, because a polishing sheet of this type has a high hardness, for example, when the sheet is used in polishing work for an aluminum base plate for a hard disc, there is a drawback in that defects may occur at a surface of the aluminum base plate.

On the other hand, a polishing sheet obtained by pasting a film with a high hardness or the like to an elastic plastic foam of a suede type with a foam structure produced by wet film forming process has been disclosed (for example, refer to JP10-249709A publication). An elastic plastic foam is generally produced by the wet film forming process, and relatively large cells extending in a direction approximately perpendicular to a polishing face are formed in the interior of the elastic plastic foam. Further, elastic plastic exists between adjacent cells in a manner of a partition wall, and relatively small fine foams whose sizes have not been controlled are formed in the partition wall.

Further, a polishing sheet for a silicon wafer where fine particles of barium carbonate are contained in an elastic plastic foam as abrasive particles has been disclosed (for example, refer to JP2001-1270A publication).

However, since the polishing sheet disclosed in the JP10-249709A publication has an elastic plastic foam sheet as a base sheet, there are problems about the polishing efficiency and the roll-off like that in the JP05-8178A publication. Further, when the polishing sheet of the JP2001-1270 publication is used in polishing work for an aluminum base plate, there is such a problem that defects may occur at a surface of the aluminum base plate by the fine particles contained in the polishing sheet. Accordingly, there is a need for development of a polishing sheet which can secure flatness of a material to be polished and has a high polishing efficiency, and which does not cause defects at a surface of the material to be polished, such as an aluminum base plate or the like.

SUMMARY OF THE INVENTION

In view of the above circumstances, an object of the present invention is to provide a polishing sheet which has an elastic plastic foam sheet as a polishing sheet and which can secure flatness of a material to be polished and can improve a polishing efficiency, and a polishing work method using the polishing sheet.

In order to achieve the above object, a first aspect of the present invention is directed to a polishing sheet having an elastic plastic foam sheet containing fine particles, wherein the elastic plastic foam sheet has a fine foam structure to be formed at a polishing face thereof by separating off the fine particles.

In the first aspect, since the elastic plastic foam sheet has a fine foam structure to be formed at a polishing face thereof by separating off the fine particles, fine foams which can reserve a polishing liquid containing abrasive particles are formed at the polishing face by separating off the fine particles from the polishing face. Therefore, the abrasive particles contained in the polishing liquid are always supplied to the fine forms formed at the polishing face during polishing, so that a polishing efficiency can be improved and a flatness of a material to be polished can be secured.

In the first aspect, a continuously foamed body of polyurethane may be used for the elastic plastic foam sheet. Further, fine particles may be contained in the polishing face of the elastic plastic foam sheet to be separable therefrom. In this case, it is preferable that the particle diameter of the fine particles is in the range of from 0.6 μm to 5 μm, since, when the diameter is less than 0.6 μm, sizes of the fine foams are too small to allow the abrasive particles to be reserved in the fine foams, and when the diameter exceeds 5 μm, the strength of the elastic plastic foam sheet becomes lowered. If the fine particles are abrasive particles of at least one kind selected from ceric oxide, zirconia, alumina-zirconia, aluminum oxide, alumina ceramics, silicon dioxide, silicon carbide, diamond, ferric oxide, titanium oxide, manganese dioxide, calcium carbonate, and chromium oxide, the fine particles can be easily separated off from the polishing face because these particles have no coupling or bonding property with the elastic plastic foam. In this case, as a second aspect of the present invention, the elastic plastic foam sheet may have first fine foamed cells to be formed by separating off the fine particles and second fine foamed cells that do not contain the fine particles at the polishing face.

Furthermore, a third aspect of the present invention is directed to a polishing work method for a material to be polished, which uses a polishing sheet which has an elastic plastic foam sheet in which fine particles are contained and has a fine foam structure to be formed at a polishing face thereof by separating off the fine particles, comprising the steps of; attaching the polishing sheet to a surface plate of a polishing machine; and after all the fine particles are substantially separated off from the polishing face, performing polishing work with the polishing sheet to the material to be polished by using a polishing liquid containing abrasive particles.

According to the third aspect of the present invention, since all the fine particles are substantially separated off from the polishing face prior to the polishing work, the same function and effects as the first aspect can be achieved, and since the fine particles do not exist at the polishing face of the material to be polished when the polishing work is performed, occurrence of defects at the polishing face of the material to be polished due to the fine particles can be prevented. At this time, the polishing machine for separating off all the fine particles substantially from the polishing face may be differed from a polishing machine for conducting the polishing work, and dummy polishing may be performed by the same polishing machine for separating off all the fine particles substantially from the polishing face.

BRIEF DESCRIPTION OF THE DRAWINGS

An embodiment where a polishing sheet according to the present invention is applied to a polishing pad polishing for an aluminum base plate used for a hard disc will be explained with reference to the following drawings.

DETAILED DESCRIPTION OF THE PREFERRED EMBODIMENTS

<Polishing Pad>

Figure 1:
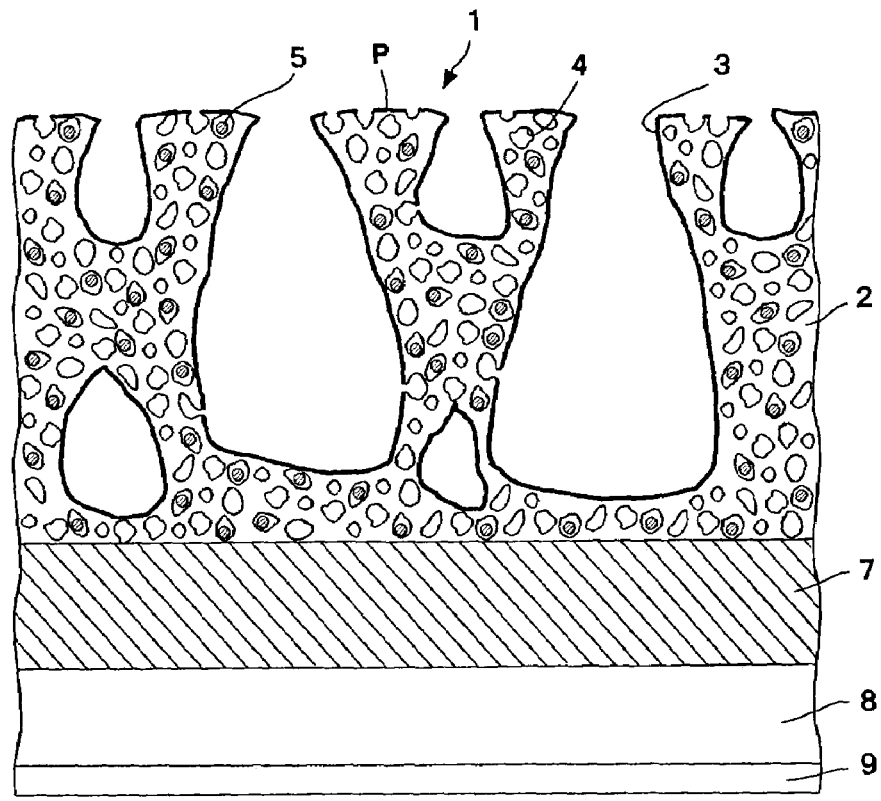
FIG. 1 is a sectional view illustratively showing a polishing pad of an embodiment to which the present invention is applicable.

As shown in FIG. 1, a polishing pad 1 (a polishing sheet) has a polyurethane sheet 2 which is formed from polyurethane resin as an elastic (soft) plastic foam sheet whose one face is formed like nap. The polyurethane sheet 2 is formed with large cells (pores) 3 with a generally triangular section, which are rounded along a direction of a thickness thereof. The cell 3 is formed such that a size of a portion of the cell positioned at the side of a polishing face P opposed to a face of a material to be polished is made smaller than that of a portion of the cell positioned at the side of an attaching face of the polishing pad to a polishing machine. Polyurethane resin exists in a manner of a partition wall between adjacent cells 3, and fine foams 4 dispersed generally evenly are formed in the polyurethane resin. These fine foams 4 mutually connect 3-dimensionally in a network manner through fine communication holes (not shown). Therefore, the polyurethane sheet 2 is constituted as a continuously foamed body of polyurethane.

Fine particles 5 added at a time of manufacturing the polyurethane sheet 2 are contained in some of the fine foams 4. The particle diameter of the fine particle 5 is set to a range of from 0.6 to 5 μm, and the fine foam 4 is set such that the size thereof is larger than the particle diameter of the fine particle 5. The fine foam 4 containing the fine particle 5 generally has a space larger than the fine foam 4 which does not contain the fine particle 5. Further, the fine particles 5 which are positioned at the polishing face P of the polyurethane sheet 2 and positioned in the vicinity of an inner wall face of the cell 3 exist in fine foams 4 which can be separated from the polishing face P and the inner wall face of the cell 3. Therefore, the fine particles 5 are contained in the polyurethane sheet 2 and the polyurethane sheet 2 has a fine foam structure to be formed at the side of the polishing face P by separating off fine particles 5. Incidentally, the cells 3 and some of the fine foams 4 are opened at the polishing face P of the polyurethane sheet 2.

Further, the polishing pad 1 is provided, at an opposing face side (a lower face side) to the polishing face P of the polyurethane sheet 2, with a film layer 7 made of polyethylene terephthalate (PET) which is utilized as a base material at a time of manufacturing the polyurethane sheet 2. A double adhesive tape 8 for attaching the polishing pad 1 to a polishing machine, which has a peeling paper (release paper) 9 on one face side (a lowermost face side) thereof is adhered to a lower face side of the film layer 7.

<Manufacturing Method of Polishing Pad>

Figure 3:
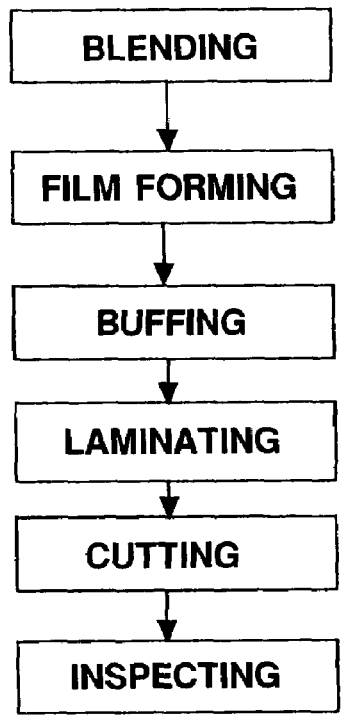
FIG. 3 is a process diagram showing manufacturing process of a polishing pad.

As shown in FIG. 3, in order to manufacture a polishing pad 1, first, polyurethane resin, fine particles 5 and additives are blended in blending process. Polyurethane resin such as polyester base resin, polyether base resin or the like is used as the resin, and polyurethane resin is dissolved in N, N-dimethyl-formaldehyde (hereinafter, abbreviated as DMF) of a solvent such that it occupies 30% in solution, so that polyurethane resin solution is obtained. As additives, pigment such as carbon black or the like, hydrophilic activator for accelerating foaming, hydrophobic activator of film-forming stabilizer and the like can be used in order to control the size or amount (number) of the fine foams 4.

As the fine particles 5, fine particles which have neither compatibility with polyurethane resin solution nor bonding property with a polyurethane resin and, for example, in case of fine particles for abrasive particles, fine particles of one kind or mixture of at least two kinds selected from a group of ceric oxide, zirconia, alumina-zirconia, aluminum oxide, alumina ceramics, silicon dioxide, silicon carbide, diamond, ferric oxide, titanium oxide, manganese dioxide, calcium carbonate, and chromium oxide can be used. When the amount of addition of the fine particles 5 to the polyurethane resin is less than 1% by weight, change of the fine foam 4 is reduced (the size of the fine foam 4 is small) so that it becomes hard to exhibit effects in polishing. On the contrary, when the amount of addition is more than 100% by weight, because the polishing pad 1 itself is reduced in strength and separating-off property (from the polishing face P and the inner wall face of the cell 3) of the fine particles 5 is deteriorated, the amount is not preferable. The amount of addition of the fine particles 5 is preferably in a range of from 1 to 100% by weight, more preferably in a range of from 10 to 50% by weight.

Fine particles 5, additives such as pigment and the like, and DMF which is a solvent are added in prepared polyurethane resin solution to be stirred and mixed sufficiently. After aggregated masses or the like are removed by filtration, resin emulsion including fine particles 5 added and mixed is prepared by carrying out defoaming under vacuum.

In the next film forming process, the prepared resin emulsion is continuously applied on a base member (the film layer 7) made of PET such that its thickness becomes substantially uniform by using a reverse coater, and the polyurethane resin is re-solidified by dipping the base member in water to remove the DMF. When the DMF is removed from the resin emulsion in water, relatively large cells 3 are formed. At this time, since the DMF is removed from the surface side of the resin emulsion applied rather than the base member side due to that the base member hinders water from permeating thereinto, portions of the cells 3 positioned at the side of the base member are formed so as to become larger than portions thereof at the surface side. Further, when the DMF is separated into water, fine foams 4 are formed in the polyurethane resin in a continuous foaming manner. Incidentally, the fine foams 4 are formed in a partition wall of the polyurethane sheet 2 so as to be distributed generally evenly.

Figure 4:
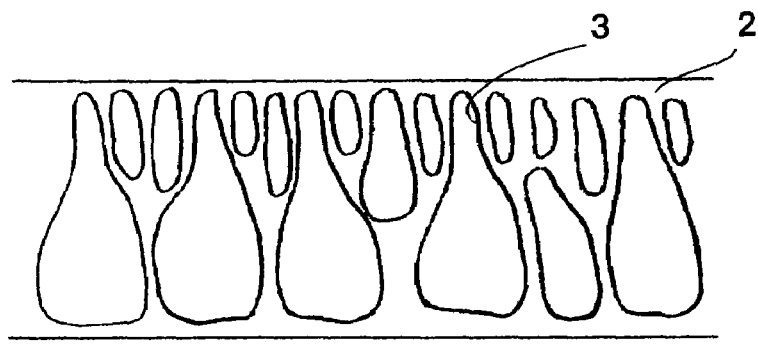
FIG. 4 is a sectional view illustratively showing a polyurethane sheet before conducting buffing process.
Figure 5:
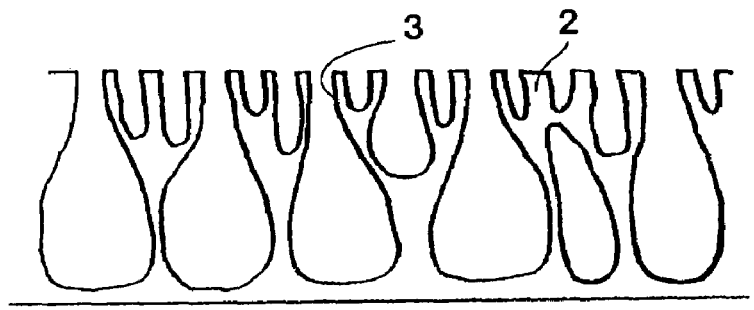
FIG. 5 is a sectional view illustratively showing the polyurethane sheet after conducting the buffing process.

Next, in buffing process, buffing (surface sanding) is performed to a surface of the polishing face P side of the sheet-like polyurethane resin obtained, thereby removing a surface layer (so-called a skin layer) of the polyurethane resin. FIG. 4 and FIG. 5 illustratively show a polyurethane sheet 2 before buffed and a polyurethane sheet 2 after buffed, respectively. By the buffing process, some of the cells 3 and the fine foams 4 are opened to the polishing face P, so that the polishing face P of the polyurethane sheet 2 obtains a nap property. At this time, the fine particles 5 positioned in the vicinity of the polishing face P of the polyurethane sheet 2 are contained in the fine foams 4 such that they may be separated therefrom. Incidentally, the film layer 7 is omitted in FIGS. 4 and 5.

Here, the cells 3 are formed to be aligned in the obtained sheet-like polyurethane resin in a thickness direction thereof and the polyurethane resin exists in a partition wall shape for partitioning the cells 3. In the above-described film forming process, if control is carried out such that the sizes of the fine foams 4 are made large without changing the shape, the size of the cells 3 formed in the polyurethane sheet 2 and the used amount of the polyurethane resin, the thickness of the partition wall becomes large so that the area of the polishing face P (refer to FIG. 1) of the polyurethane sheet 2 becomes large. Accordingly, in the film forming process, by polishing efficiency during polishing work into consideration, control is carried out so as to secure the thickness of the partition walls to become large, i.e., the area of the polishing face P of the polyurethane sheet 2 to become large.

Next, in laminating process, one face of a double adhesive tape 8 with a peeling paper 9 attached to the other face thereof is adhered to a face opposite to the polishing face P of the base member (the film layer 7), and in the next cutting process, dies cutting is performed so as to obtain a desired shape, for example, a circle with a diameter of 640 mm. Subsequently, in inspecting process, an inspection is made for confirming that there is neither stain nor adhesion of scraps, such as buffs or the like, on a product, so that a polishing pad 1 is finished.

<Polishing Work>

Next, a polishing work method where polishing pads 1 are attached or mounted to a polishing machine for both surface polishing serving as a polishing machine and polishing work is conducted to an aluminum base plate serving as a material to be polished will be explained.

Figure 7:
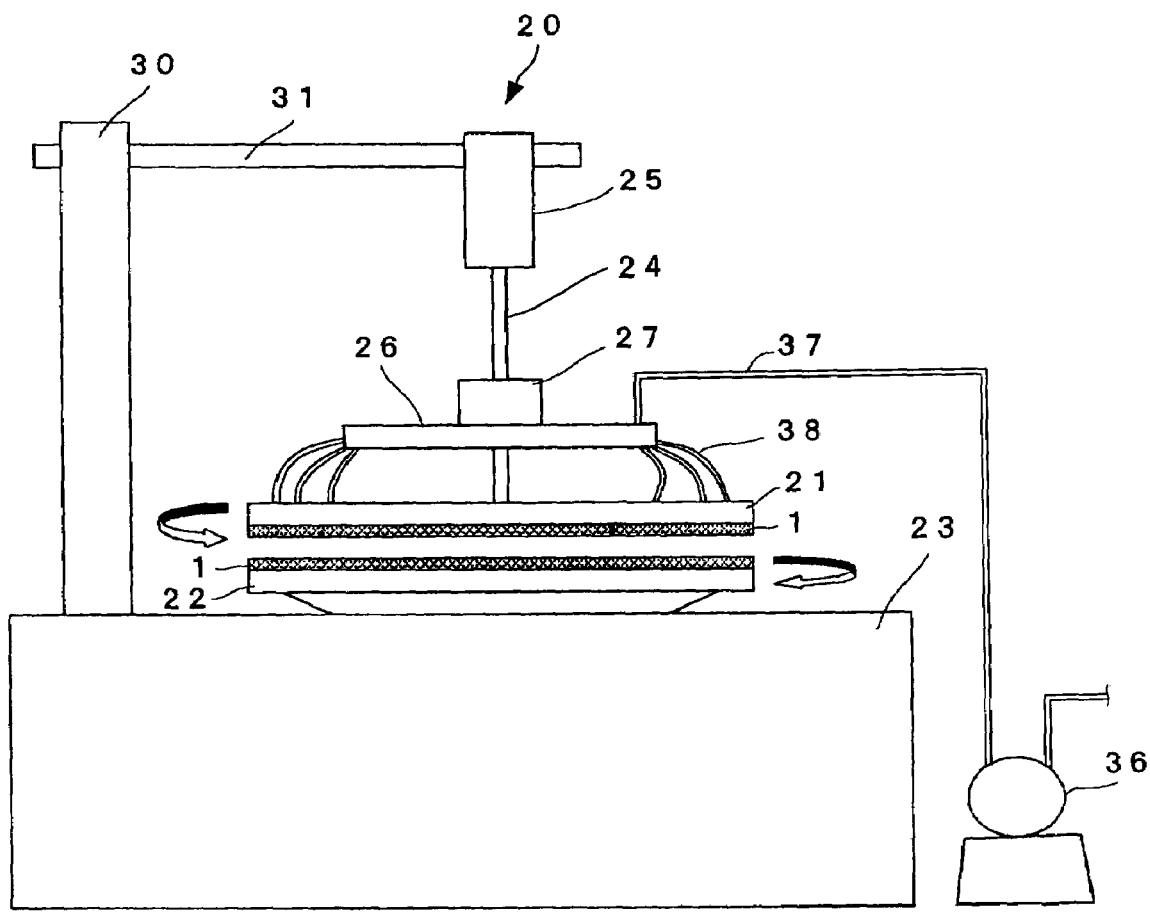
FIG. 7 is a front view showing a schematic constitution of a polishing machine.

As shown in FIG. 7, a polishing machine 20 used for polishing work is provided with a base stand 23 in which a power source section, a control section, a motor for driving the polishing machine 20 and the like. A lower surface plate 22 for polishing a lower face of an aluminum base plate that is a material to be polished is disposed above the base stand 23. An upper surface plate 21 for polishing an upper face of the aluminum base plate, which has a center axis on an extension of a center axis of the lower surface plate 22, is disposed above the lower surface plate 22. Polishing pads 1 are respectively attached to an upper face of the lower surface plate 22 and a lower face of the upper surface plate 21. The upper surface plate 21 and the lower surface plate 22 are supported so as to be respectively rotatable in opposite directions (arrows in FIG. 7), and a rotational driving force for the upper surface plate 21 is conveyed from the motor inside the base stand 23 via a vertical transmission shaft (not shown) housed in a post 30, a horizontal support shaft 31 and a drive shaft 24, while a rotational driving force for the lower surface plate 22 is conveyed from the motor via gears (not shown) and the like. Further, a surface plate vertical moving cylinder 25 which can move the upper surface plate 21 vertically is fixed to the horizontal support shaft 31. Furthermore, the drive shaft 24 extends through a supply disc 26 which has a plurality of polishing liquid supplying tubes 38 to supply the polishing liquid to the upper surface plate 21 to be fixed to the upper surface plate 21. A working pressure adjusting cylinder 27 for adjusting a pressure which pressurizes the upper surface plate 21 toward the lower surface plate 22 during polishing work is disposed on the supply disc 26.

Further, one end of a liquid feeding pipe 37 for feeding the polishing liquid is connected to the supply disc 26, and another end thereof is connected to a liquid feeding pump 36 for feeding the polishing liquid. The liquid feeding pump 36 is connected to a polishing liquid tank (not shown) which reserves the polishing liquid.

(Polishing Pad Attaching Process)

Figure 6:
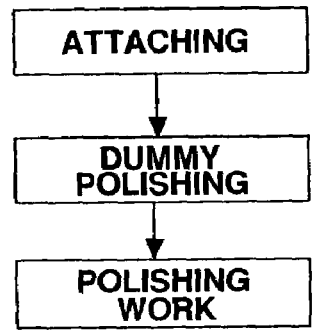
FIG. 6 is a process diagram showing an outline of polishing work process.

As shown in FIG. 6, in attaching process, first, the polishing pads 2 are attached to the polishing machine 20. That is, the upper surface plate 21 is moved upwardly by the surface plate vertical moving cylinder 21 to be separated from the lower surface plate 22, so that the peeling paper 9 are peeled off from the polishing pads 1 and the polishing pads 1 are pasted to the lower face of the upper surface plate 21 and the upper face of the lower surface plate 22. Incidentally, in this state, fine particles 5 are contained in the polishing faces P of the two polishing pads 1 to be separable therefrom.

(Dummy Polishing Process)

Figure 2:
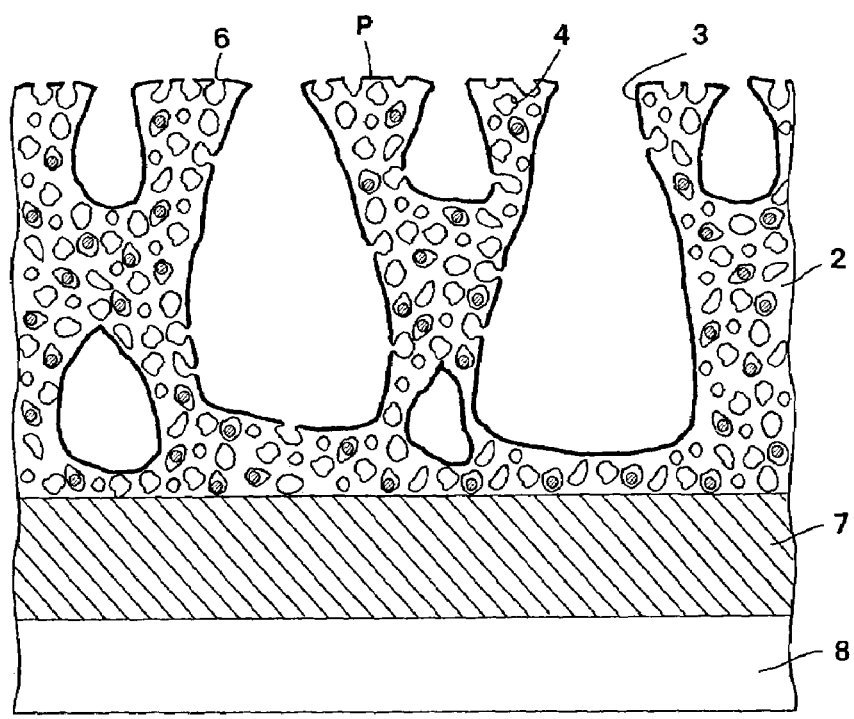
FIG. 2 is a sectional view illustratively showing a state of the polishing pad according to the embodiment where fine particles at a polishing face have been separated by dummy polishing.

In the next dummy polishing process, the upper surface plate 21 is moved downward by the surface plate vertical moving cylinder 25, a dummy material to be polished which is equivalent to an aluminum base plate (an aluminum base plate different from a subject aluminum base plate for polishing work) is sandwiched between the two upper and lower polishing pads 1, and then a dummy polishing for separating off fine particles existing at the polishing faces P of the polishing pads 1 and existing in the vicinity of inner wall faces of the cells 3 is conducted under the conditions such that a rotational speed of a motor, an applied pressure and the like are substantially equal to those in case of actual polishing of an aluminum base plate. As shown in FIG. 2, in the dummy polishing process, all the fine particles positioned at the polishing faces P of the two upper and lower polishing pads 1 and in the vicinity of the inner wall faces of the cells 3 are separated off from the fine foams 4 by pressing force from the working pressure adjusting cylinder 27 and deformation of the partition walls due to rotations of the upper surface plate 21 and the lower surface plate 22, and new fine openings of the fine foams 4 which can reserve and allow the polishing liquid to move are formed in addition of the openings of the fine foams 4 formed in the buffing process. As described above, in the film forming process for the polishing pad 1, since the fine foams 4 are formed so as to be distributed uniformly in the partition walls of the polyurethane sheet 2, a state that the fine foams 4 are generally uniformly distributed at the polishing face P can be obtained in this dummy polishing process.

(Polishing Work Process)

Figure 8:
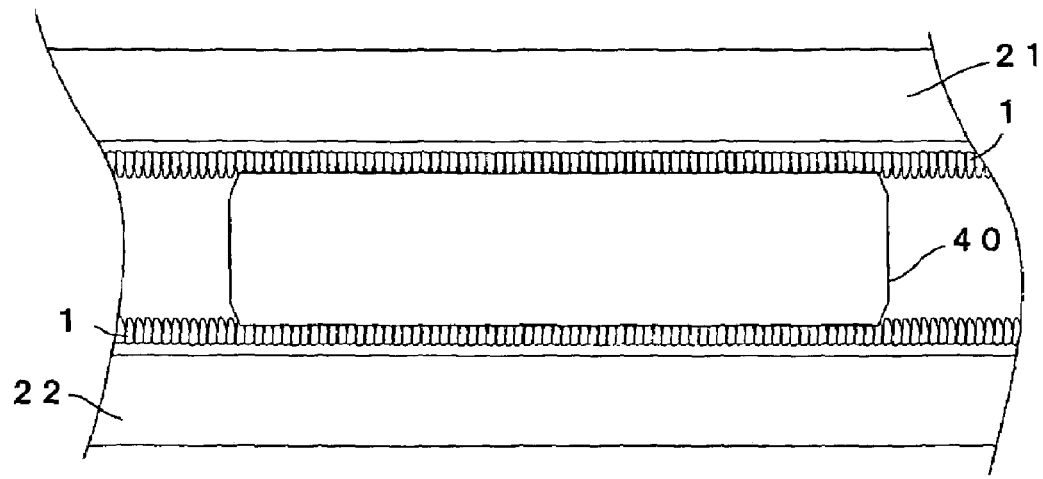
FIG. 8 is a sectional view illustratively showing polishing work process for an aluminum base plate.

Next, in polishing work process, the dummy material to be polished is replaced by a subject aluminum base plate for polishing work, and then both surfaces of the aluminum base plate are subjected to polishing work. That is, as shown in FIG. 8, an aluminum base plate 40 is sandwiched by two polishing pads 1 rotated together with the upper surface plate 21 and the lower surface plate 22 due to pressure from the working pressure adjusting cylinder 27, and a slurry-like polishing liquid 35 including abrasive particles is supplied between the polishing pads 1 and the aluminum base plate 40. The abrasive particles contained in the polishing liquid 35 enter into a space between the polishing pads 1 and the aluminum base plate 40 so that both the surfaces (surfaces to be polished) of the aluminum base plate 40 are subjected to polishing work.

As described above, in the polishing pad 1 of this embodiment, the fine foams 4 are approximately uniformly distributed at the polishing face P, and the polishing liquid containing the abrasive particles is reserved inside the fine foams 4 and the cells 3, and it is movable through the communication holes formed in the network manner. The spaces (pores) of the fine foams 4 obtained by separating off the fine particles 5 in the dummy polishing process are larger than those of the fine foams 4 in which no fine particles exist originally. Accordingly, the former allows the abrasive particles to move in a higher degree of freedom than the latter, and the number of the spaces of the fine foam 4 can be controlled to increase by adjusting the addition amount of the fine particles 5 in the blending process. For this reason, in the polishing process, the polishing work is conducted to the aluminum base plate 40 such that the abrasive particles contained in the polishing liquid can move between the fine foams 4 and the cells 3 through the communication holes and that they can be generally uniformly and sufficiently supplied to the faces to be polished of the aluminum base plate 40. Therefore, the polishing work can be conducted without causing polishing unevenness while flatness is being secured to the surface of the aluminum base plate 40, and the polishing work is conducted approximately evenly to both a peripheral portion and a central portion of the aluminum base plate 40, thereby inferior work due to the roll-off can be reduced.

Further, in the polishing pad 1 of the present embodiment, it is possible to secure the area of the polishing face P of the polyurethane sheet 2 to be larger by controlling the thickness of the partition walls to become large. Therefore, since a contacting area of the polishing face P and the aluminum base plate 40 is increased by thus increasing the area of the polishing face P of the polishing pad 1, it is made possible to improve polishing efficiency.

Further, in the polishing work using the polishing pad 1 of this embodiment, since all the fine particles 5 are substantially removed (separated off) from the polishing face P in the dummy polishing process, no fine particles 5 exist at the polishing face P in the polishing work process. Accordingly, occurrence of the defects due to the polishing work to the surface of the aluminum base plate 40 can be prevented.

In general, for polishing work to the aluminum base plate 40, a particle diameter of abrasive particles used is in a range of from 0.1 to 1 μm or so in primary polishing and it is in a range of from 0.001 to 0.1 μm or so in secondary polishing. In this embodiment, since the fine foam 4 is formed such that its size is larger than the particle diameter of the fine particle 5, the fine foam 4 having a desired size can be easily realized by changing the particle diameter of the fine particles 5 that are added when manufacturing the fine form 4. If the diameter of the particle size 5 is smaller than 0.6 μm, the size of the fine foam 4 becomes too small to reserve the abrasive particles, so that it becomes difficult to enhance the polishing efficiency. On the contrary, if the particle diameter is larger than 5 μm, the strength of the polishing pad 1 and the separating-off property of the fine particles 5 are influenced because the thickness of the partition walls of the polyurethane resin is in a range of from 5 to 10 μm or like at thin portions thereof. Due to these reasons, for polishing, the particle diameter of the fine particle 5 is preferably from 0.6 μm to 5 μm, and more preferably from 1 μm to 3 μm. By controlling the sizes of the fine foams 4 and the communication holes in the film forming process, the movement of the polishing liquid including the abrasive particles is made easy inside the polishing pad 1, between the cells 3 and between the fine foams 4. Therefore, not only in the secondary polishing but also in the primary polishing, the polishing efficiency can be improved in cooperation with supplying of the polishing liquid from the inside of the polishing pad 1 and the cells 3 to the fine foams 4.

Incidentally, in this embodiment, the polyurethane resin sheet has been exemplified as the elastic plastic foam sheet, but this invention is not limited to this example. For example, resin which forms continuous foams such as polyester resin may be used. When the polyester resin is used, continuous foams may be easily formed according to the wet film forming process. Further, in this embodiment, the wet film forming process has been exemplified as the process for manufacturing the polyurethane sheet, dry film forming process may be used. At this time, for example, hydrophilic activator or the like for promoting foaming may be added to form continuous foam body.

Further, in this embodiment, the coating of the resin emulsion to the PET-made base material by the reverse coater has been exemplified, however, for example, a roll coater or a knife coater may be used. Any coater may be used as long as it can allow uniform coating to the base material. Further, for example, a nonwoven sheet, a woven sheet or the like may be listed as a usable base material other than the PET.

Furthermore, in this embodiment, the example that the polyurethane sheet 2 is formed on the base material made of the PET has been shown, but it is possible to obtain only the polyurethane sheet 2 by peeling off the base material that is solidified in a wet type manner after applying the resin emulsion to the PET, and the polyurethane sheet 2 may be directly attached to the surface plate of the polishing machine. In this case, other base material may be adhered to the polyurethane sheet 2, and a nonwoven sheet or a woven sheet made of synthetic fibers may be used as the base material other than the film made of the PET.

Further, in this embodiment, the polishing machine 20 which polishes both surfaces of the material to be polished has been exemplified as the polishing machine, but the present invention may, of course, be applied to a polishing machine which polishes one surface of a material, and a polishing machine which polishes a resin-made lens, a spherical glass or the like. Furthermore, in this embodiment, the example that the polishing pads 1 are attached to the polishing machine 20, and the fine particles at the polishing face are separated off by the dummy polishing has been shown, but the polishing pad 1 may be attached to the polishing machine 20 after the fine particles 5 of the polishing pad 1 have been separated off in advance by using an exclusive polishing machine for dummy polishing, an exclusive machine for separating off fine particles (for example, which may be a machine for carrying out the separating-off by utilizing vibrations) or the like. By employing such an exclusive machine, the fine particles 5 are almost entirely prevented from entering into the polishing machine 20. In the above-described embodiment, the example that fine particles are separated off from the polishing face P of the polishing pad 1 under the same conditions as those in the case that the aluminum base plate is polished has been shown, however, it is unnecessary to make the conditions in the dummy polishing process equal to those in the polishing work process since it is sufficient in this invention that once the fine particles are separated off from the polishing face P of the polishing pad 1.

Next, examples of the polishing pad 1 manufactured according to the above embodiment will be explained. Incidentally, comparative examples manufactured for comparison will also be described.

EXAMPLE 1

As shown in the following Table 1, in Example 1, white fused alumina particles having an average particle diameter of 2.0 μm were used as the fine particles 5, and polyester-diphenylmethane diisocyanate (MDI) base polyurethane resin was uses as the polyurethane resin. Resin emulsion was prepared by adding and blending white fused alumina of 40 weight parts, a DMF dispersing liquid of 40 weight parts including carbon black of 30% as pigment, and hydrophilic activator of 2 weight parts, hydrophobic activator of 2 weight parts and DMF of 52 weight parts, to DMF solution of 100 weight parts including polyurethane resin of 30%. The polishing pad 1 was manufactured by using this resin emulsion.

TABLE 1

| | PARTICLE DIAMETER (μm) | ADDITION AMOUNT (WEIGHT PART) TO DMF SOLUTION OF 100 WEIGHT PARTS INCLUDING POLYURETHANE RESIN OF 30% |
|---|---|---|
| EXAMPLE 1 | 2.0 | 10 |
| EXAMPLE 2 | 0.6 | 10 |
| EXAMPLE 3 | 5.0 | 10 |
| EXAMPLE 4 | 2.0 | 3 |
| EXAMPLE 5 | 2.0 | 10 |
| EXAMPLE 6 | 2.0 | 15 |
| COMPARATIVE EXAMPLE 1 | NON-ADDITION | 0 |
| COMPARATIVE EXAMPLE 2 | 2.0 | 30 |

EXAMPLE 2 TO EXAMPLE 3

As shown in Table 1, in Examples 2 and 3, the same conditions as those in Example 1 were employed except for a difference in a particle diameter of the white fused alumina particles. In Example 2, the particle diameter was 0.6 μm and in Example 3, it was 5.0 μm.

EXAMPLE 4 TO EXAMPLE 6

As shown in Table 1, in Examples 4 to 6, the same conditions as those in Example 1 were employed except for a difference in an addition amount of the white fused alumina. In Example 4, the addition amount of the white fused alumina was 3 weight parts, in Example 5, it was 10 weight parts, and in Example 6, it was 15 weight parts.

COMPARATIVE EXAMPLE 1

As shown in Table 1, in Comparative Example 1, the same conditions as those in Example 1 were employed except for non-addition (0 weight parts) of the white fused alumina.

COMPARATIVE EXAMPLE 2

As shown in Table 1, in Comparative Example 2, the same conditions as those in Example 1 were employed except for an addition amount of the white fused alumina of 30 weight parts. However, a polishing pad could not be manufactured because film forming was not achieved.

(Dummy Polishing and Polishing Work)

By using the polishing pads of Examples and Comparative Examples, dummy polishing and polishing work were conducted under the following conditions:

Used Polishing Machine: 9B-5P POLISHING MACHINE manufactured by SPEED FIRM INC.

Polishing Speed (rpm): 25 r/m

Working Pressure: 100 g/cm$^2$

Slurry (Polishing Liquid): DL3471 produced by FIJIMI CORPORATED (average particle diameter: 0.8 μm; Mixed liquid of DL3471: water=1:3 was used.)

Slurry Supplying Amount: 100 cc/min

Kind of Material to be Polished: aluminum base plate for 95 mmφ hard disc

Polishing Time: one minute; three minutes (Evaluation)

Next, the polishing pads of Examples and Comparative Examples were evaluated on the basis of improvement degree in waviness calculated from a polishing rate to an aluminum base plate and waviness thereof. Further, regarding polished aluminum base plates, appearance evaluation about presence/absence of defect occurrence to surfaces of the aluminum base plates was made according to visual inspection. Furthermore, section structures of the polyurethane sheets of Examples and Comparative Examples in the vicinity of the polishing faces P thereof were confirmed by microscopic photographs.

(Polishing Rate)

The polishing rate is one of numerical values indicating a polishing efficiency and it represents a polishing amount per one minute with a thickness. Weight reduction of the aluminum base plate was calculated from measured weight before the polishing work and measured weight after the polishing work, and then the polishing rate was calculated from the polished area and the specific gravity of the aluminum base plate.

(Improvement Degree in Waviness)

Waviness is one of measurement items for evaluating a surface accuracy (flatness) to a disc base plate, a silicon wafer or the like, it is expressed with angstrom unit (A) to a waviness amount (Wa) per unit area of a surface image which is observed by an optical non-contacting surface roughness tester. Evaluation was made by using the "Opti-flat" as a test and evaluation machine. In particular, in a disc base plate used for a fixed magnetic disc (a hard disc) device used in combination with a floating type magnetic head, since floating property of the magnetic head deteriorates according to an increase of this waviness, it is important to suppress the waviness as small as possible during the polishing work. As the measured numerical value becomes lower, the waviness becomes small, accordingly, which means that a more flat face is realized. An improvement degree in waviness is a difference in a waviness amount (Wa) between the aluminum base plate before and after the polishing work, and an increase in the improvement degree means a reduction in the waviness amount, which indicates that a flatness of the aluminum base plate is secured.

Regarding the polishing pads 1 of Example 1 to Example 3 and the polishing pad of Comparative Example 1, the results obtained by conducting the polishing work tests about a polishing time of one minute and evaluating the polishing rates, the improvement degrees in waviness and the appearances of these polishing pads are shown in Table 2. Further, regarding the polishing pads 1 of Example 1 to Example 6 and the polishing pad of Comparative Example 1, the results obtained by conducting polishing work tests about a polishing time of three minutes and evaluating the polishing rates, the improvement degrees in waviness and the appearances of these polishing pads are shown in Table 3.

TABLE 2

|  | POLISHING RATE ($\mu$/min) | IMPROVEMENT DEGREE IN WAVINESS (Å) | DEFECTS |
|---|---|---|---|
| EXAMPLE 1 | 0.8 | 2.21 | Non |
| EXAMPLE 2 | 0.8 | 1.90 | Non |
| EXAMPLE 3 | 0.9 | 2.04 | Non |
| COMPARATIVE EXAMPLE 1 | 0.8 | 1.85 | Non |

As shown in Table 2, regarding the polishing rate, all of the polishing pads 1 of Example 1 to Example 3 where the white fused alumina was added and the polishing pad of Comparative Example 1 where no white fused alumina was added were stable and there was found no difference among them. Further, regarding the appearance, no defects were found at the surfaces of the polished aluminum base plates. The polishing pads 1 of Example 1 to Example 3 were improved largely regarding the waviness as compared with the polishing pad of Comparative Example 1. It was confirmed that the improvement degree of Example 1 where the white fused alumina particles with the particle diameter of 2.0 $\mu$m were added was high among them.

As shown in Table 3, the improvement degree in waviness is improved by extending the polishing time. However, the polishing pads of Examples are higher in improvement degree than the polishing pad of Comparative Example 1 even if the polishing time is extended. Furthermore, regarding the addition amount of the white fused alumina, it was confirmed that the improvement degree in waviness of Example 5 including the white fused alumina of 10% by weight was high.

TABLE 3

|  | POLISHING RATE ($\mu$/min) | IMPROVEMENT DEGREE IN WAVINESS (Å) | DEFECTS |
|---|---|---|---|
| EXAMPLE 1 | 0.7 | 3.75 | Non |
| EXAMPLE 2 | 0.7 | 3.05 | Non |
| EXAMPLE 3 | 0.8 | 3.33 | Non |
| EXAMPLE 4 | 0.7 | 3.20 | Non |
| EXAMPLE 5 | 0.7 | 3.75 | Non |
| EXAMPLE 6 | 0.6 | 3.35 | Non |
| COMPARATIVE EXAMPLE 1 | 0.7 | 2.90 | Non |
| COMPARATIVE EXAMPLE 2 | (Film Forming Impossible) | | |

Figure 9:
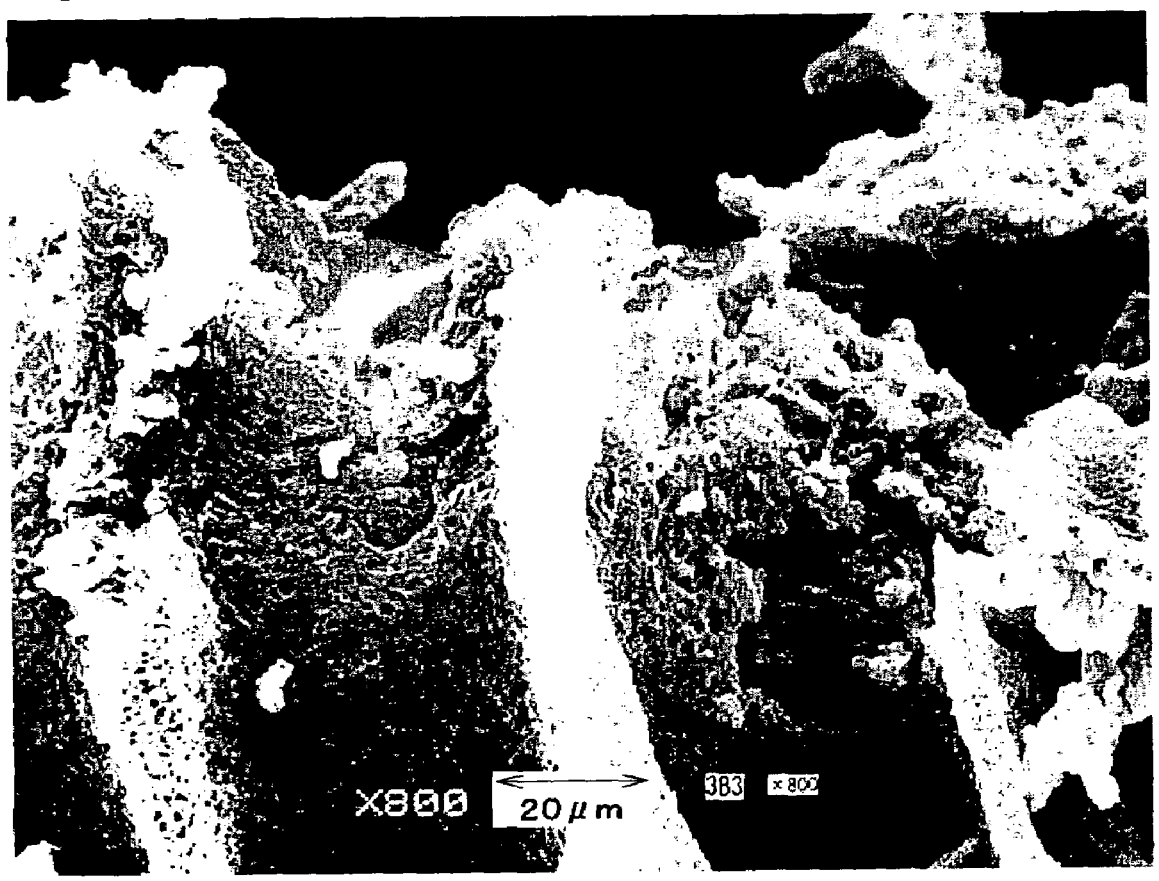
FIG. 9 shows an electron microscopic photograph in the vicinity of a polishing face of a polishing pad of a comparative example 1 before conducting dummy polishing.
Figure 10:
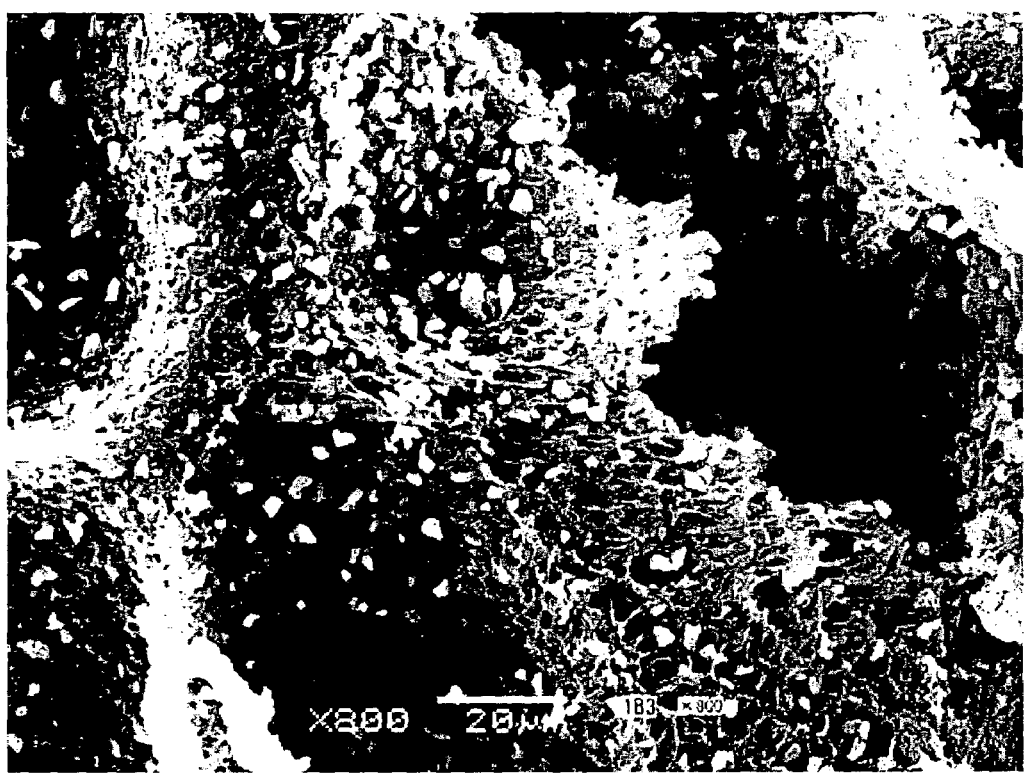
FIG. 10 shows an electron microscopic photograph in the vicinity of a polishing face of a polishing pad of a example 1 before conducting dummy polishing.
Figure 11:
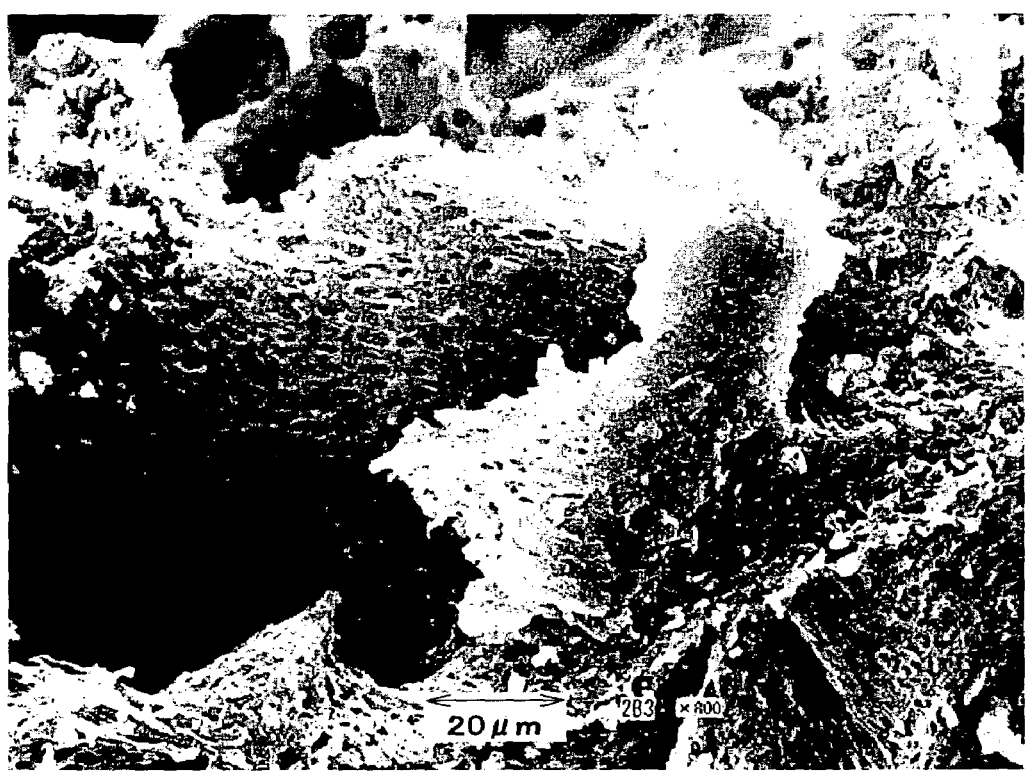
FIG. 11 shows an electron microscopic photograph in the vicinity of a polishing face of a polishing pad of a example 1 after conducting dummy polishing.

FIGS. 9 and 10 show electron microscopic photographs of portions in the vicinity of the polishing faces of the polishing pads of Comparative Example 1 and Example 1 before the dummy polishing is conducted. As apparent from FIG. 10, it is found that the alumina particles with the particle diameter of 2 $\mu$m are dispersed evenly in the polishing pad of Example 1. Further, FIG. 11 shows an electron microscopic photograph of a portion in the vicinity of a polishing face of the polishing pad 1 of Example 1 after the dummy polishing was conducted. Almost all the alumina particles at the polishing face and the inner wall faces of the cells were separated and only a slight amount of the particles confined in the partition walls remain in the polishing pad. Thus, it is possible to change the sizes and the number of fine foams in the partition walls by addition of the alumina particles.

What is claimed is:

1. A polishing sheet having an elastic plastic foam sheet containing fine particles, wherein the elastic plastic foam sheet has a fine foam structure including fine foam cells formed at a polishing face thereof in part by separating off the fine particles, wherein said fine foam cells reserve a polishing liquid containing abrasive particles, and the elastic plastic foam sheet has large foam cells, each having a diameter larger than those of the fine foam cells in an interior thereof, and said large foam cells having diameters substantially larger on average than that of the fine foam cells, and that reserve polishing liquid containing abrasive particles, and wherein communication holes are formed between the large foam cells and the fine foam cells.

2. A polishing sheet according to claim 1, wherein the elastic plastic foam sheet is a continuously foamed body of polyurethane.

3. A polishing sheet according to claim 1, wherein the fine particles are contained in the polishing face of the elastic plastic foam sheet to be separable therefrom.

4. A polishing sheet according to claim 1, wherein the fine foam structure is opened at the polishing face.

5. A polishing sheet according to claim 1, wherein a particle diameter of the fine particles is in a range of from 0.6 $\mu$m to 5 $\mu$m.

6. A polishing sheet according to claim 5, wherein the particle diameter of the fine particles is in a range of from 1 $\mu$m to 3 $\mu$m.

7. A polishing sheet according to claim 1, wherein the fine particles are particles of at least one kind selected from a group comprising ceric oxide, zirconia, alumina-zirconia, aluminum oxide, alumina ceramics, silicon dioxide, silicon carbide, diamond, ferric oxide, titanium oxide, manganese dioxide, calcium carbonate, and chromium oxide.

8. A polishing sheet according to claim 1, wherein said average diameters of said large foam cells are multiples of an average diameter of said fine foam cells.

9. A polishing sheet having an elastic plastic foam sheet containing fine particles, wherein the elastic plastic foam sheet has first fine foam cells to be formed by separating off the fine particles and second fine foam cells that do not contain the fine particles at a polishing face, and the elastic plastic foam sheet has large foam cells, each having a diameter larger than those of the first and the second fine foam cells in an interior thereof, and said large foam cells having diameters substantially larger on average than those of the first and the second firm foam cells, and the first and second fine foam cells and the large foam cells reserve a polishing liquid containing abrasive particles, and wherein communication holes are formed among the first and second fine foam cells and the large foam cells.

10. A polishing sheet according to claim 9, wherein the first fine foam cells are opened at the polishing face.

11. A polishing sheet according to claim 9, wherein a space volume occupied by each of the first fine foam cells is larger than that occupied by each of the second fine foam cells.

12. A polishing sheet according to claim 9, wherein each of the first fine foam cells has at least a size for allowing abrasive particles contained in a polishing liquid for secondary polishing to enter thereinto and exit therefrom.

13. A polishing sheet according to claim 9, wherein each of the second fine foam cells has at least a size for allowing abrasive particles contained in a polishing liquid for secondary polishing to enter thereinto and exit therefrom.

14. A polishing sheet according to claim 9, wherein the elastic plastic foam sheet is a continuously foamed body of polyurethane.

15. A polishing sheet according to claim 14, wherein each of the communications holes has a diameter larger than those of abrasive particles contained in a polishing liquid for secondary polishing.

16. A polishing sheet according to claim 9, wherein the fine particles are contained at the polishing face of the elastic plastic foam sheet to be separable therefrom.

17. A polishing sheet according to claim 9, wherein a particle diameter of the fine particles is in a range of from 0.6 μm to 5 μm.

18. A polishing sheet according to claim 9, wherein the particle diameter of the fine particles is in a range of from 1 μm to 3 μm.

19. A polishing sheet according to claim 9, wherein the fine particles are particles of at least one kind selected from a group comprising ceric oxide, zirconia, alumina-zirconia, aluminum oxide, alumina ceramics, silicon dioxide, silicon carbide, diamond, ferric oxide, titanium oxide, manganese dioxide, calcium carbonate, and chromium oxide.

20. A polishing sheet according to claim 9, wherein said average diameters of said large foam cells are multiples of an average diameter of said fine foam cells.

* * * * *